Aug. 23, 1932.  W. G. GERNANDT  1,873,877
DIESEL ENGINE
Filed Aug. 27, 1928

W. G. Gernandt  INVENTOR.
BY
Townsend, Loftus & Abbett
ATTORNEYS.

Patented Aug. 23, 1932

1,873,877

UNITED STATES PATENT OFFICE

WALDO G. GERNANDT, OF HAYWARD, CALIFORNIA

DIESEL ENGINE

Application filed August 27, 1928. Serial No. 302,301.

This invention relates to Diesel engines, and especially to a structure whereby turbulence is promoted, better atomization and mixing of fuel and air insured, and general efficiency of the combustion or burning cycle increased.

In the operation of internal combustion engines, whether of the Otto or Diesel types, it has been found that turbulence of the explosive mixture or the air during the burning cycle is an important factor as it not only causes a more intimate mixture of the fuel and air with better combustion as the result, but it also promotes flame propagation, and in general increases the efficiency of the burning cycle.

To impart turbulence or movement to the air within the cylinder of a Diesel engine during the burning cycle is by no means new, as numerous structures such as specifically shaped combustion chambers, pistons, baffles etc. have been used, but I have discovered that the structure employed, and the position of the nozzle with relation to the moving air greatly affects the degree of fuel atomization, the size, shape and location of the combustion chamber, the efficiency of combustion, the rate of flame propagation etc. Having observed and recognized these features, I have designed a Diesel engine in which the combustion chamber is so shaped and positioned with relation to the cylinder that high turbulence or air velocity is secured, flame propagation is promoted and the fuel injected where the air velocity is greatest thus causing better atomization and intimate mixture of air and fuel. The invention is shown by way of illustration in the accompanying drawing, in which:

Figure 1:
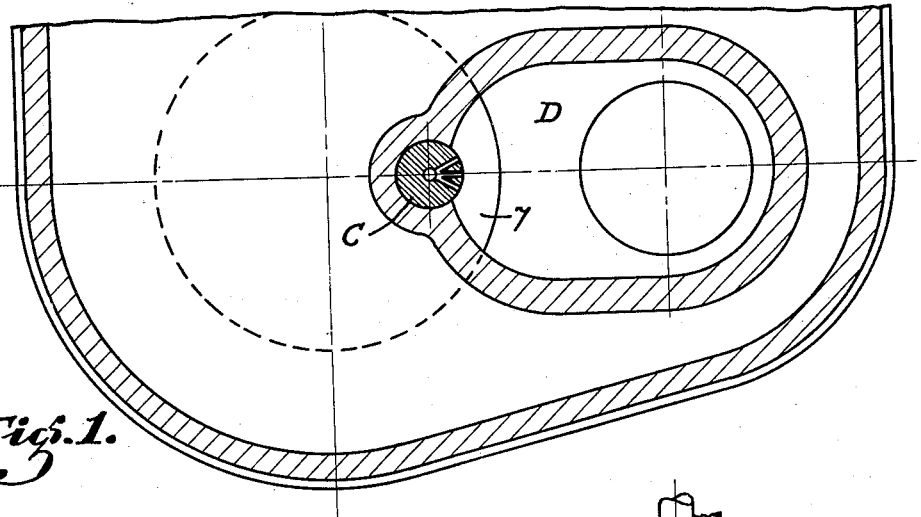
Fig. 1 is a plan section taken on line I—I of Fig. 2.

Referring to the drawing in detail, A indicates a standard form of Diesel engine cylinder, 2 the main working piston, 3 the inlet valve, 4 the exhaust valve, B the cylinder head, and C the spray nozzle whereby fuel is injected.

Any suitable type of spray nozzle may be employed, for instance spray nozzles having a fixed discharge orifice, or mechanically actuated spray nozzles whereby the injection is controlled by a valve, such as indicated at 6.

Figure 2:
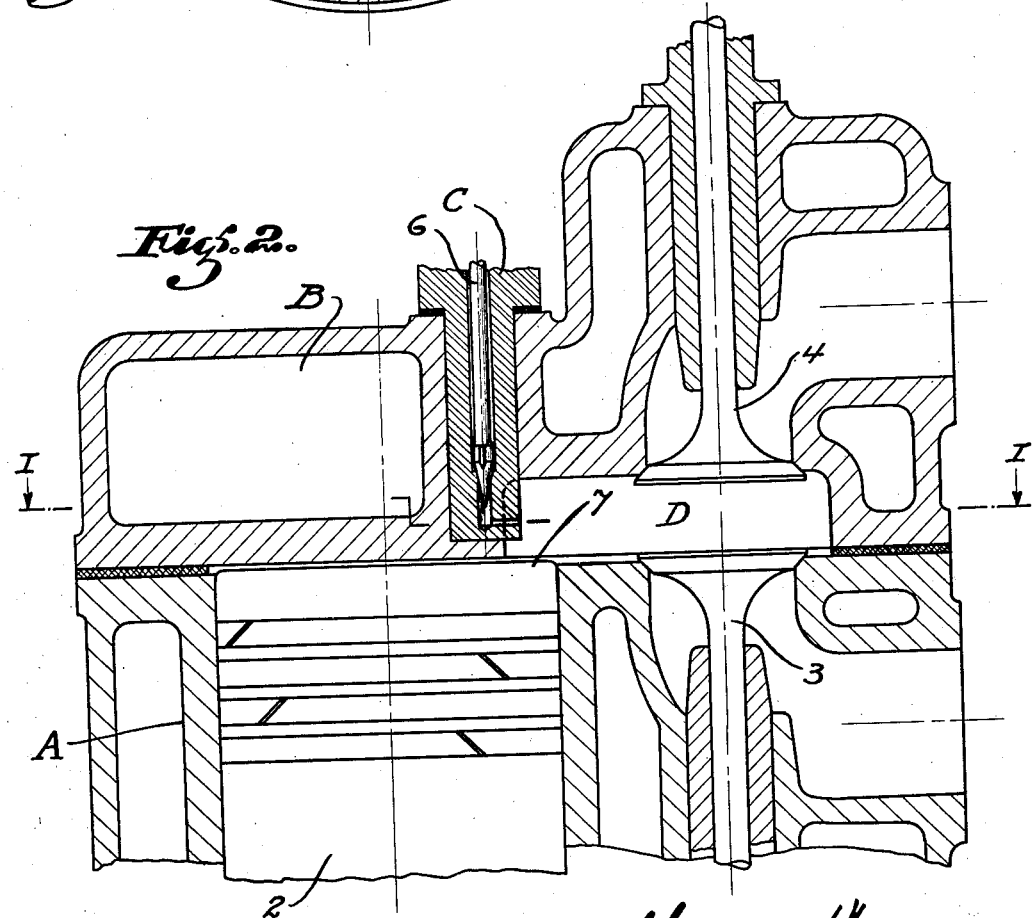
Fig. 2 is a central vertical section of the cylinder head and the upper end of the cylinder of a Diesel engine constructed according to the present invention.

By referring to Fig. 2 it will be noted that the combustion chamber indicated at D is formed in the cylinder head, and that it is located slightly above the main cylinder and at one side thereof. It will also be noted that one end of the combustion chamber communicates with the main cylinder through a communicating port or opening indicated at 7. It should also be noted that the discharge orifice of the spray nozzle C is located directly above the communicating opening 7, and that substantially all the air when compressed is contained in the combustion chamber D, as the piston at the upper end of its stroke substantially contacts with the cylinder head.

The shape of the combustion chamber, its position with relation to the working cylinder, and the position of the spray orifice or the nozzle are important features of the present invention.

First, by locating the combustion chamber as shown, all or substantially all the air during the compression stroke is forced into the combustion chamber and practically no air remains in the cylinder proper, as the clearance space between the piston and the cylinder head when the piston reaches the top of its stroke is maintained at a minimum. By forcing or crowding all the air from the cylinder into the combustion chamber, great turbulence and high velocity is produced during the compression stroke, and turbulence and high velocity is also obtained during the burning or firing stroke, as all of the air must rush back through the communicating opening or passage 7 to re-enter the cylinder during the downward stroke of the piston. It is due to the shape and position of the combustion chamber that this turbulence is produced.

Secondly, by placing the spray nozzle adjacent the passage 7 where the turbulence or air velocity will naturally be the highest, better atomization is obtained, as the oil is injected against the air which is rushing from the combustion chamber back into the cylinder. A more intimate mixture of air and oil is at the same time obtained and due to the turbulence and velocity flame propagation is promoted.

Third, the problem of fuel spray penetration, that is, impingement of the spray against adjacent hot surfaces is also substantially prevented, as the fuel is injected in a highly atomized condition directly against the air which is passing under high velocity from the combustion chamber into the cylinder. Hence, it is possible to construct a comparatively small short combustion chamber, as shown in Figs. 1 and 2.

While the invention is particularly intended for use in conjunction with a system of injecting fuel such as described in my co-pending application entitled "Method and apparatus for preparing fuel for combustion" I wish it understood that such fuel injecting system is not essential as it is obvious that it might be used in conjunction with a fuel nozzle of the solid injection type, and also with a spray nozzle where air atomization is employed.

I also wish it understood that while certain features of the present invention are more or less specifically described, various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. In a Diesel engine, a cylinder, a head, a combustion chamber formed in the head at one side of the cylinder, said combustion chamber having its bottom wall in substantial alignment with the top of the cylinder, said cylinder and head forming a passage between said combustion chamber and cylinder, and a fuel jet in said passage having fuel passages extending parallel to the bottom wall of the combustion chamber.

2. In a Diesel engine, a cylinder having a piston, a head, having a combustion chamber formed therein at one side of the cylinder, said combustion chamber having an overlapping relation with said cylinder to form a communicating passageway, and a fuel jet opening into the combustion chamber at the overlapping portion thereof above said piston arranged to inject fuel at right angles to the cylinder axis.

3. In a Diesel engine, a cylinder and a head having cooperating surfaces forming a combustion chamber offset radially and axially from the cylinder, said surfaces also forming a communicating passageway between the combustion chamber and the cylinder, inlet and exhaust valves in the combustion chamber, and a fuel spray nozzle adjacent the passageway arranged to inject fuel in a direction away from the cylinder and toward the center of the combustion chamber.

4. In a Diesel engine, a cylinder and cylinder head separately formed and having cooperating surfaces forming a combustion chamber offset radially and axially from the cylinder, said surfaces also forming a communicating passageway between the combustion chamber and the periphery of the cylinder, an inlet valve in the combustion chamber, and a fuel spray nozzle adjacent the passageway arranged to inject fuel centrally of the combustion chamber.

WALDO G. GERNANDT.